United States Patent [19]
Nickl et al.

[11] 3,969,335
[45] July 13, 1976

[54] MANUFACTURE OF HOMOPOLYMERS OF 4-METHYLPENTENE-1

[75] Inventors: Johann Nickl, Bad Durkheim; Hans Schick, Mannheim; Heinz Mueller-Tamm, Ludwigshafen, all of Germany

[73] Assignee: BASF Aktiengesellschaft, Ludwigshafen (Rhine), Germany

[22] Filed: Feb. 6, 1975

[21] Appl. No.: 547,643

[52] U.S. Cl. .............................. 526/154; 526/350; 526/905
[51] Int. Cl.² .................... C08F 4/52; C08F 110/14
[58] Field of Search .................................. 260/93.7

[56] References Cited
FOREIGN PATENTS OR APPLICATIONS

| | | | |
|---|---|---|---|
| 1,520,146 | 12/1970 | Germany | 260/88.2 F |
| 1,145,886 | 3/1969 | United Kingdom | 260/88.2 F |
| 849,090 | 9/1960 | United Kingdom | |

*Primary Examiner*—Alan Holler
*Attorney, Agent, or Firm*—Johnston, Keil, Thompson & Shurtleff

[57] ABSTRACT

Homopolymers of 4-methylpentene-1 are prepared by homopolymerization of 4-methylpentene-1 at a temperature above room temperature, in the presence of hydrogen and in contact with a Ziegler/Natta catalyst system. The polymerization is carried out at a relatively very high temperature and in the presence of an inert gas, the polymerization system being under a specific total pressure, while the partial pressures of the inert gas and the hydrogen have specific values. In this way, homopolymers having large crystalline fractions are obtained in high yields per unit of catalyst system per unit time.

7 Claims, No Drawings

MANUFACTURE OF HOMOPOLYMERS OF 4-METHYLPENTENE-1

This application discloses and claims subject matter described in German Patent Application P 24 06 900.9, filed Feb. 14, 1974, which is incorporated herein by reference.

The present invention relates to a process for the manufacture of homopolymers of 4-methylpentene-1 by homopolymerization of 4-methylpentene-1 (1) at a temperature above room temperature, (2) in the presence of hydrogen and (3) in contact with a Ziegler/Natta catalyst system consisting of (3.1) a titanium trichloride component and (3.2) an alkyl aluminum component, the atomic ratio of titanium in catalyst component (3.1) to aluminum in catalyst component (3.2) being from 1:1 to 1:100.

The known processes of this kind are carried out at relatively low temperatures to ensure that the products exhibit maximum crystallinity. This is in accordance with a teaching, which can be traced back to Natta, that in polymerizations using Ziegler/Natta catalysts, th stereospecificity of the catalyst system and thus the crystallinity of the polymers obtained decreases relatively rapidly with rising polymerization temperature and vice versa. (See for example G. Natta, Journal of Polymer Science, Vol. 34 (1959), pp. 531 et seq., "Properties of Isotactic, Atactic and Stereo Block Homopolymers, Random and Block Copolymers of $\alpha$-Olefins".) When operating in this manner in the known processes, homopolymers of 4-methylpentene-1 are obtained which have satisfactory to good properties. However, one drawback of the prior art processes is that only relatively small amounts of polymer are produced per unit of catalyst system per unit time.

It is an object of the present invention to provide a process of the kind defined above which suffers from the above drawback either not at all or to a considerably lesser degree.

We have found that the above object is achieved by carrying out the process at relatively high temperatures hitherto virtually unknown for Ziegler/Natta catalyst systems and, as a further essential feature, by effecting polymerization in the presence of specific inert gases under a specific total pressure of the polymerization system and specific partial pressure relationships between the inert gas and hydrogen.

The process defined above, unlike other processes of this type, surprisingly produces products of which the crystallinity is the same or virtually the same as that of similar products obtained at considerably lower temperatures and in the absence of inert gas.

Thus the present invention relates to a process for the manufacture of homopolymers of 4-methylpentene-1 by homopolymerization of 4-methylpentene-1 at (1) a temperature above room temperature and (2) in the presence of hydrogen using (3) a Ziegler/Natta catalyst system consisting of (3.1) a titanium trichloride component and (3.2) an alkyl aluminum component, the atomic ratio of titanium in catalyst component (3.1) to aluminum in catalyst component (3.2) being from 1:1 to 1:100 and in particular from 1:3 to 1:40. The process of the invention is characterized in that the polymerization is carried out a. at a temperature of from 90° to 150°C and in particular from 110° to 130°C, b. in the presence of an inert gas consisting or composed of nitrogen, helium, neon, argon and/or krypton, c. at a total pressure of the polymerization system of from 3 to 20 and in particular from 8 to 10 atmospheres absolute and d. with the proviso that ($d_1$) the partial pressure of the inert gas in the polymerization system is from 0.1 to 17 and in particular from 1 to 5 atmospheres absolute and ($d_2$) the partial pressure of the hydrogen in the polymerization system is from 0.01 to 10 and in particular from 0.1 to 2 atmospheres absolute.

This process produces homopolymers of 4-methylpentene-1 not only in a more than proportionately increased yield (per unit of catalyst system per unit time) which yield is at a maximum at temperatures of from about 110° to about 130°C, but also showing a relatively high crystallinity satisfying industrial requirements for various applications.

The process itself may be carried out in conventional manner within the definition given above, apart from the characterizing features of the invention, for example continuously or batchwise and in the presence or absence of liquid diluents and, in particular, in the presence of liquid excess 4-methylpentene-1 as polymerization medium. To avoid, in this specification, superfluous descriptions of the methods of carrying out conventional processes of this kind, it is pointed out that the process of the invention may be carried out as described, for example, in East German Pat. No. 15,050 and West German Published Applications 1,217,071 and 1,420,503 with appropriate changes to make allowance for the special features of the present invention.

The following comments relate to the individual elements of the process of the invention.

A. Suitable titanium trichloride components (3.1) of the Ziegler/Natta catalyst system (3) are the conventional components of this kind, although the following components have proved particularly successful in the present context:

$A_1$. Complexes of the formula $TiCl_3 \cdot 1/3\ AlCl_3$ and the component $TiCl_3$ obtained by reducing $TiCl_4$ with hydrogen, $A_2$. titanium compounds of the kind mentioned under ($A_1$) modified with electron donors. The electron donors may be those commonly used in Ziegler/Natta catalyst systems. Examples of suitable donors are those described in French Pat. No. 1,231,089 or U.S. Pat. No. 3,186,977.

Particularly suitable donors for the present purpose have been found to be tributylphosphine, triphenylphosphine, triphenylphosphine oxide, $\gamma$-picoline and hexamethylphosphoric triamide.

It has also been found advantageous to select the amounts of titanium compound of the kind mentioned under ($A_1$) and the electron donor such that the molar ratio of these substances is from 1:0.1 to 1:1 and preferably from 1:0.1 to 1:0.4 and to unite these two substances by intense milling or prolonged heating of the mixture thereof in a hydrocarbon as suspension medium in conventional manner.

B. The alkyl aluminum component (3.2) of the Ziegler/Natta catalyst system may also be one known in the art, particularly suitable compounds being those of the general formulae $AlR^3$ and $AlR^2Cl$ (where $R = C_{1-10}$ alkyl). The following compounds have been found to be particularly suitable for the purpose of the invention: diethyl aluminum chloride, ethyl aluminum sesquichloride and diisobutyl aluminum chloride.

C. The hydrogen partial pressure in the polymerization system may be increased if it is desired to decrease the molecular weight of the polymer, and vice versa.

D. Of the inert gases named, nitrogen and argon are particularly suitable.

cosity $[\eta]$ of the polymer (determined according to DIN 53,726 in g/dl) and the heptane-insolubility of the polymer (HI in %) as a measure of the degree of crystallinity and measured with 2.5 g of polymer in 350 g of heptane at 98°C, are also listed in Table I below.

TABLE I

| Example | DEAC | TTCC | PT | I | $P_{tot}$ | $P_I$ | $P_{H_2}$ | YP | CE | $[\eta]$ | HI |
|---|---|---|---|---|---|---|---|---|---|---|---|
| 1 | 1.86 | 0.120 | 92 | $N_2$ | 9.0 | 5.5 | 0.5 | 234 | 1950 | 2.6 | 68.7 |
| 2 | 0.94 | 0.061 | 120 | $N_2$ | 7.5 | 1.25 | 0.5 | 251 | 4100 | 2.3 | 64.7 |
| 3 | 0.93 | 0.060 | 120 | $N_2$ | 9.0 | 2.75 | 0.5 | 252 | 4200 | 2.3 | 65.8 |
| 4 | 1.05 | 0.068 | 137 | $N_2$ | 9.2 | 0.65 | 0.5 | 228 | 3350 | 2.3 | 66.0 |
| 5 | 1.01 | 0.065 | 137 | $N_2$ | 11.0 | 2.45 | 0.5 | 232 | 3570 | 2.1 | 64.3 |
| 6 | 1.09 | 0.060*) | 120 | $N_2$ | 9.1 | 2.85 | 0.5 | 240 | 4000 | 2.1 | 64.2 |
| 7 | 0.73 | 0.047 | 120 | He | 9.0 | 2.75 | 0.5 | 250 | 5300 | 2.3 | 67.9 |
| 8 | 0.77 | 0.050 | 120 | He | 11.2 | 4.95 | 0.5 | 268 | 5270 | 2.2 | 69.8 |
| 9 | 0.82 | 0.053 | 120 | He | 16.0 | 9.75 | 0.5 | 220 | 4150 | 2.4 | 67.6 |
| 10 | 0.85 | 0.055 | 120 | Ar | 9.1 | 2.85 | 0.5 | 242 | 4400 | 2.3 | 66.5 |
| Comparative Tests | 0.98 | 0.063 | 120 | — | 6.25 | — | 0.5 | 187 | 2970 | 2.4 | 63.1 |
| | 1.55 | 0.100 | 137 | — | 8.25 | — | 0.5 | 260 | 2600 | 2.5 | 66.6 |
| | 1.00 | 0.055*) | 120 | — | 6.25 | — | 0.5 | 195 | 3050 | 2.2 | 64.5 |

*)$TiCl_3$ . 1/3 $AlCl_3$ milled without added tributylphosphine and used in the polymerization in this form.

The homopolymers obtained in the present process are valuable starting materials for the manufacture of shaped articles such as injection moldings in the form of, say, laboratory vessels and clinical articles. They are transparent and heat resistant up to a temperature of about 150°C.

EXAMPLES 1 to 10

The following ingredients are placed in a stirred autoclave having a capacity of 1 liter and equipped with heating and cooling means:

($\alpha$) 330 g of 4-methylpentene-1, ($\beta$) diethyl aluminum chloride (DEAC) in an amount as listed (in g) in Table I below, and ($\gamma$) a titanium trichloride component (TTCC) obtained by milling $TiCl_3$ . 1/3 $AlCl_3$ with tributylphosphine in a molar ratio of 1:0.17 for seven hours in a vibratory ball mill, the amount used of this component being listed (in g) in Table I below, the said amount being such as to give an atomic ratio of titanium in the titanium trichloride component (3.1) to aluminum in the alkyl aluminum component (3.2) of 1:30.

Polymerization is carried out with stirring at a temperature (PT, in °C) given in Table I below. Table I also lists the type of inert gas present ($N_2$, He or Ar) and the total pressure of the polymerization system ($P_{tot}$ in atmospheres absolute) and the partial pressures of the inert gas ($P_I$ in atmospheres absolute) and of the hydrogen ($P_{H_2}$ in atmospheres absolute). Polymerization is carried out in all cases for 2 hours.

The polymer is isolated by venting the autoclave and cooling its contents to about 25°C followed by precipitation of the polymer with 400 g of methanol, filtration and washing of the precipitate with 300 g of methanol. The precipitate is dried for 5 hours at 70°C to give a white polymer powder. The yield of polymer (YP in g) and the catalyst efficiency (CE in g of polymer per g of titanium trichloride component) and the intrinsic vis-

EXAMPLES 11 to 18

An autoclave having a capacity of 25 liters and equipped with heating and cooling means and an asymmetrical anchor agitator is used in the following manner for semi-continuous polymerization of 4-methylpentene-1:

12 liters of 4-methylpentene-1 are placed in the autoclave and the temperature is raised to 120°C and nitrogen (as inert gas) and hydrogen are pumped into the autoclave and maintained at the pressures indicated in Table II below (total pressure of the polymerization system $P_{tot}$, partial pressure of inert gas $P_I$ and partial pressure of hydrogen $P_{H_2}$, all at atmospheres absolute). Polymerization is initiated by the addition of diethyl aluminum chloride (DEAC) and the titanium trichloride component (TTCC) described in Example 1, the amounts used of these substances (in g) and the atomic ratio (Ti : Al) of titanium in the titanium trichloride component (3.1) to aluminum in the alkyl aluminum component (3.2) also being listed in Table II. 3.0 l/hr of 4-methylpentene-1 are fed continuously to the autoclave during polymerization and fresh diethyl aluminum chloride and fresh titanium trichloride component are added at intervals of one hour in the same amounts as used for initiation of polymerization. Polymer is discharged at intervals of 1 hour.

The polymer is worked up in conventional manner to give a white powder.

Table II also lists some characterizing data concerning the polymer obtained, i.e. the catalyst efficiency (CE) as defined with respect to Examples 1 to 10 above, conversion (C) in % of the amount of continuously fed 4-methylpentene-1 converted to polymer, spacetime yield (STY) in tons of polymer per $m^3$ per day, and the intrinsic viscosity $[\eta]$ and the heptane-insolubility of the polymer (HI) as defined with respect to Examples 1 to 10 above.

TABLE II

| Example | $P_{tot}$ | $P_I$ | $P_{H_2}$ | DEAC | TTCC | Ti : Al | CE | C | STY | $[\eta]$ | HI |
|---|---|---|---|---|---|---|---|---|---|---|---|
| 11 | 9.00 | 3.10 | 0.15 | 3.83 | 0.2 | 1:37 | 6900 | 69.9 | 1.33 | 2.2 | 63.5 |
| 12 | 9.00 | 3.10 | 0.15 | 2.90 | 0.2 | 1:27 | 7100 | 71.9 | 1.36 | 2.2 | 63.2 |
| 13 | 9.00 | 3.10 | 0.15 | 1.97 | 0.2 | 1:19 | 6950 | 70.3 | 1.34 | 2.1 | 64.4 |
| 14 | 9.00 | 3.10 | 0.15 | 1.55 | 0.2 | 1:15 | 7000 | 70.9 | 1.35 | 2.3 | 63.0 |
| 15 | 9.00 | 3.10 | 0.15 | 0.93 | 0.2 | 1:9 | 7000 | 70.9 | 1.35 | 2.1 | 61.9 |

TABLE II-continued

| Example | $P_{tot}$ | $P_I$ | $P_{H_2}$ | DEAC | TTCC | Ti : Al | CE | C | STY | $[\eta]$ | HI |
|---|---|---|---|---|---|---|---|---|---|---|---|
| 16 | 9.00 | 3.10 | 0.15 | 0.52 | 0.2 | 1:5 | 6950 | 70.3 | 1.34 | 2.4 | 61.6 |
| 17 | 9.00 | 3.10 | 0.15 | 0.31 | 0.2 | 1:3 | 6900 | 69.9 | 1.33 | 2.5 | 61.2 |
| 18 | 9.00 | 2.90 | 0.35 | 0.52 | 0.2 | 1:5 | 7300 | 73.9 | 1.40 | 1.6 | 62.0 |
| Compara- | 5.71 | — | 0.15 | 3.83 | 0.2 | 1:37 | 4850 | 49.1 | 0.93 | 2.0 | 63.6 |
| tive | 5.71 | — | 0.15 | 2.80 | 0.2 | 1:27 | 5050 | 51.1 | 0.97 | 2.1 | 63.9 |
| Tests | 5.71 | — | 0.15 | 1.76 | 0.2 | 1:17 | 1000[x] | 10.1[x] | 0.19[x] | x) | x) |

[x] No regular polymerization takes place and the product is tacky and lumpy.

Examples 11 to 18, when considered together with the associated comparative tests, clearly show a doubly favorable tendency typical of the process of the invention. For a given amount of titanium trichloride component (TTCC) not only is more polymer obtained (at approximately equal heptane-insolubility corresponding to approximately constant crystallinity), but it is also possible appreciably to reduce the amount of alkyl aluminum component (DEAC). This means a considerable reduction in the amount of both catalyst components per unit of weight of the polymer and thus, inter alia, a considerably less polluted polymer.

We claim:

1. A process for the manufacture of homopolymers of 4-methylpentene-1 by homopolymerization of a liquid excess of 4-methylpentene-1 at (1) a temperature above room temperature and (2) in the presence of hydrogen, using (3) a Ziegler/Natta catalyst system consisting of (3.1) a titanium trichloride component and (3.2) an alkyl aluminum component, the atomic ratio of titanium in the catalyst component (3.1) to aluminum in the catalyst component (3.2) being from 1:1 to 1:100, wherein polymerization is carried out a. at a temperature of from 90° to 150°C,
  b. in the presence of an inert gas consisting of one or more of nitrogen, helium, neon, argon and krypton,
  c. at a total pressure of the polymerization system of from 3 to 20 atmospheres absolute and
  d. with the proviso that the partial pressure ($d_1$) of the inert gas in the polymerization system is from 0.1 to 17 atmospheres absolute and the hydrogen partial pressure ($d_2$) in the polymerization system is from 0.01 to 10 atmospheres absolute.

2. A process as set forth in claim 1 wherein said inert gas is nitrogen.

3. A process as set forth in claim 1 wherein said inert gas is argon.

4. A process as set forth in claim 1 wherein said reaction temperature is from 110° to 130°C.

5. A process as set forth in claim 1 wherein the total pressure of the polymerization system is from 8 to 10 atmospheres absolute.

6. A process as set forth in claim 1 wherein the partial pressure of the inert gas is from 1 to 5 atmospheres absolute.

7. A process as set forth in claim 1 wherein the partial pressure of hydrogen is from 0.1 to 2 atmospheres absolute.

* * * * *